E. A. KRIDER.
WAGON HUB.
APPLICATION FILED SEPT. 9, 1910.
1,021,610.
Patented Mar. 26, 1912.
2 SHEETS—SHEET 1.
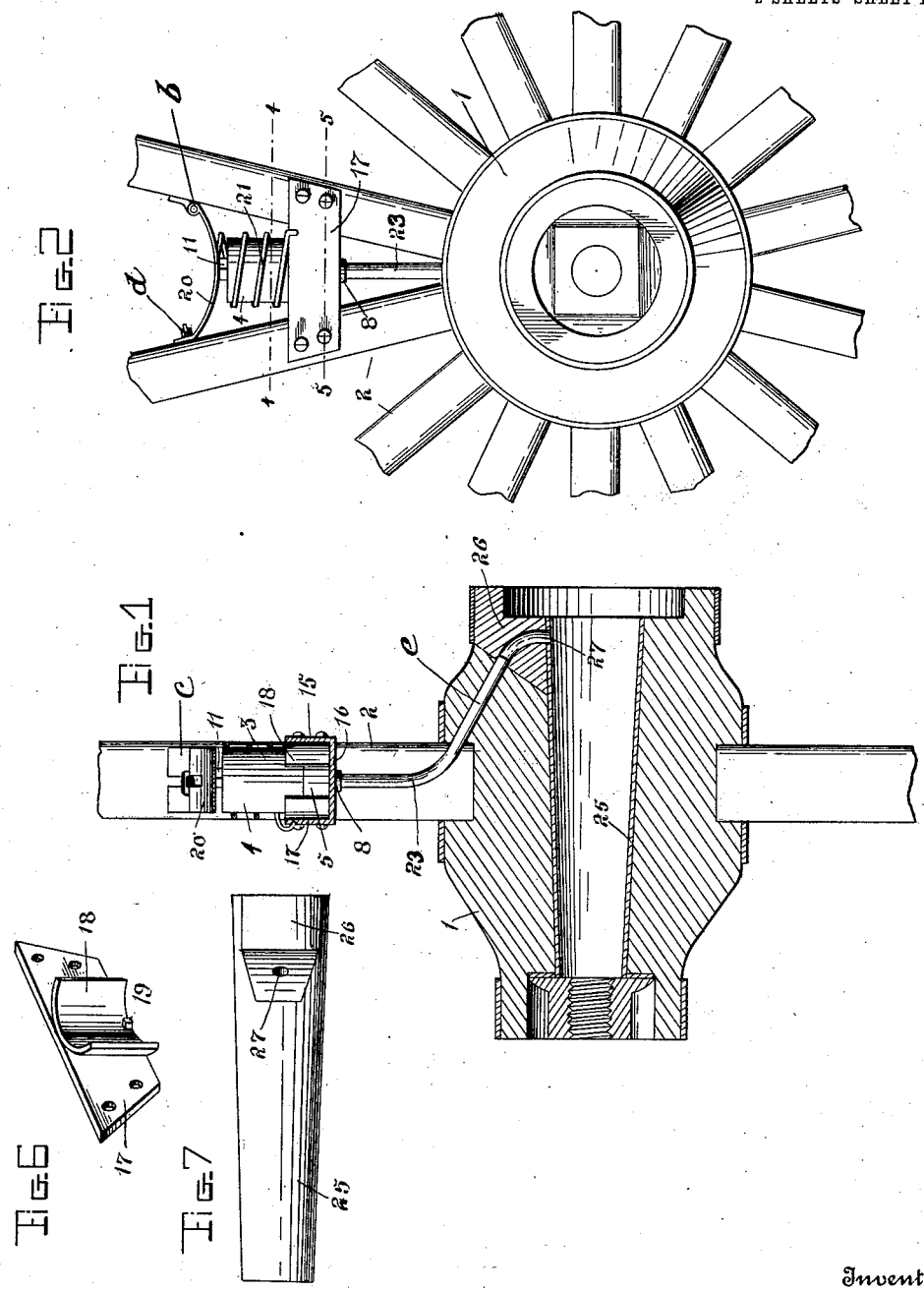
Witnesses
Alan F. Garner
Wm North
Inventor
Edward A. Krider
By Victor J. Evans
Attorney E. A. KRIDER.
WAGON HUB.
APPLICATION FILED SEPT. 9, 1910.
1,021,610.
Patented Mar. 26, 1912.
2 SHEETS—SHEET 2.
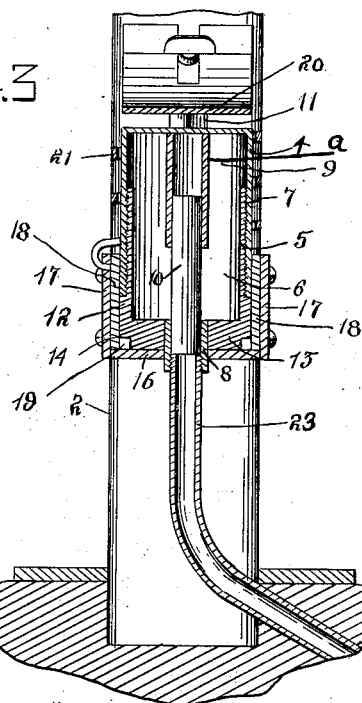
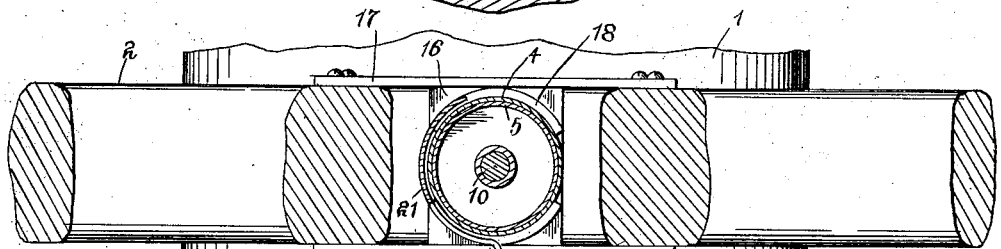
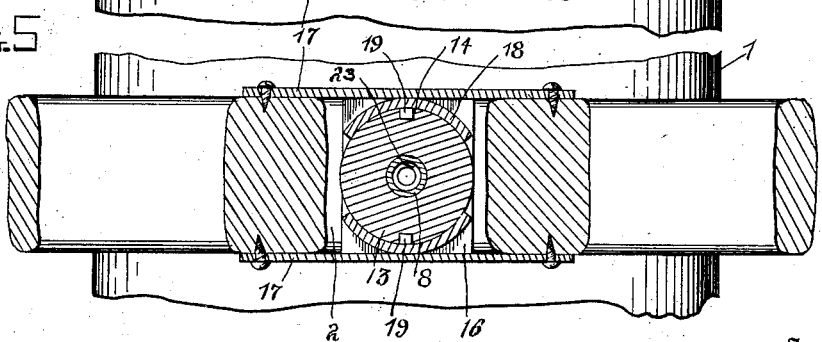
Witnesses
Alan F. Garner
Wm. ...
Inventor
Edward A. Krider
By Victor J. Evans
Attorney
COLUMBIA PLANOGRAPH CO., WASHINGTON, D. C.

UNITED STATES PATENT OFFICE.

EDWARD A. KRIDER, OF DECATUR, NEBRASKA.

WAGON-HUB.

1,021,610.  Specification of Letters Patent.  Patented Mar. 26, 1912.

Application filed September 9, 1910.  Serial No. 581,143.

*To all whom it may concern:*

Be it known that I, EDWARD A. KRIDER, a citizen of the United States, residing at Decatur, in the county of Burt and State of Nebraska, have invented new and useful Improvements in Wagon-Hubs, of which the following is a specification.

This invention relates to certain novel improvements in lubricating devices for vehicle hubs.

The primary object of the invention is the provision of means for automatically applying the lubricant to the axle, the lubricating device being positioned between two of the spokes of the wheel so that the same is not liable to be contacted by obstacles adjacent the path of travel of the vehicle or with the spokes of the wheel.

Another object of the invention is to provide a device of this class with means whereby the lubricant is fed directly to the rear of the spindle, the boxing for the hub being of a peculiar construction having an enlargement provided with a passage for the lubricant so that the said lubricant cannot impregnate the hub.

A still further object of the invention is the provision of novel means whereby the receptacle is supported at all times in a proper position between the spokes of the wheel against either lateral, longitudinal or vertical movement, and wherein the receptacle or cup may be readily removed for refilling when desired.

A still further object of the invention is to provide a lubricant receptacle with a movable plunger, which agitates the lubricant to retain the same in the liquid stage and which also provides means to permit of an intermittent feed of the lubricant from its receptacle.

With the above recited objects and others of a similar nature in view, the invention consists in the construction, combination and arrangement of parts set forth in and falling within the scope of the appended claims.

In the accompanying drawings:—Figure 1 is a central longitudinal sectional view taken through the hub of a wheel and illustrating the device in position. Fig. 2 is a front elevation of the portion of the wheel and hub having my improvement. Fig. 3 is a vertical transverse sectional view of the device. Fig. 4 is a sectional view upon the line 4—4 of Fig. 2. Fig. 5 is a similar view taken approximately on the line 5—5 of Fig. 2. Fig. 6 is a perspective view of one of the clamp plates. Fig. 7 is a top plan view of the boxing.

Referring now to the accompanying drawings in detail the numeral 1 designates the hub of an ordinary wheel and 2 the spokes connected with the hub.

The numeral 3 designates the lubricant receptacle. This receptacle comprises a pair of sections, 4 and 5 respectively. The lower section 5 is provided with a hollow bore 6 having exterior threads 7 and the said lower section is further provided with a pipe section 8 which is preferably threaded and for a purpose which will be presently set forth. The upper section 4 is provided with a threaded bore 9 which coöperates with the threads 7 of the section 5 so that the said section 4 really forms a cap or closure for the section 5. The section 4 may be centrally provided with a plunger rod 10, the latter being of a smaller diameter than the pipe extension 8 within which it is adapted to extend. The purpose of this plunger rod 10 is to serve as the means for agitating the lubricant within the cup as the wheel is revolved, and also for closing the pipe section 8 to prevent an additional flow of liquid when the spokes of the wheel between which the cup or receptacle is arranged are in the position shown in Figs. 1, 2 and 3. The member 4 of the receptacle is provided with a downwardly extending socket *a* within which the upper portion of the plunger 10 is arranged and which serves as a guide for the plunger. The section 4 has its closed top provided with an angular member 11, the same forming an off-set or head which may be engaged by a wrench or the like so that the said section 4 may be readily removed from the section 5 when it is desired to refill the receptacle. The lower portion of the section 5 is provided with a pair of oppositely disposed depressions or recesses 14, the purpose of which will presently be set forth.

Positioned between the spokes 2 is a support 15 for the lubricant receptacle. This support is of the substantially U-shaped formation comprising a base 16 and up struck portions or straps 17, the said straps being provided with suitable openings for the reception of securing elements whereby the support is sustained between two of the spokes 2. Each of the straps 17 is provided with a curved plate 18, the same being preferably constructed of some suitable resilient material, the said plates are adapted to frictionally engage with the lower portion of the section 5. Each of the plates 18 is formed with a stud 19, and the said studs are adapted to engage within the depressions 14 of the lower member of the lubricant receptacle so as to prevent the rotation of the receptacle when arranged upon its support.

The numeral 20 designates a flat spring member, the same being hingedly connected with one of the spokes 2 as at $b$ while the opposite or free end of the said spring 20 is bifurcated as at $c$, the said bifurcation being provided to permit of the spring passing over the flattened head $d$ will, of course, upon being rotated in one direction effectively lock the spring 20 and as the said spring 20 is of a greater length than the space between the opposite spokes 2, the said spring will assume an arcuate form, illustrated in Fig. 2 of the drawings, and tightly contact with angular head 11 provided upon the section 4 of the lubricant receptacle.

Surrounding the receptacle 3 and contacting between the flattened spring 20 and one or both of the straps 17, is a helical spring 21. This spring 21 is adapted to sustain the receptacle 3 in a proper vertical position between the spokes 2, and the said helical spring also tends to force the flattened spring 20 out of engagement with the head 11 of the section 4 when the turn buckle $d$ has been operated to release the said flattened spring 20.

The numeral 23 designates a pipe which has one of its extremities communicating with the pipe 8. This pipe 23 has its lower portion arranged at an angle and extends through an angular passage $e$ provided by the hub 1.

It is one of the objects of the present invention to deliver the lubricant to the rear portion of the spindle of the axle as, from experience, it has been found that this portion of the spindle is the first to become dry and as a consequence the wheels run hard and the spindles are often worn and become useless. It is also an object of the present invention to provide the hub 1 with effective means whereby the lubricant may be delivered without contacting with or saturating the hub or permitting the lubricant delivery pipe to contact with the spindle, and thus injure the same.

To accomplish these purposes I have provided the hub 1 with a boxing 25, the same having its rear portion formed with an integral enlargement 26, the said enlargement being provided with a port 27 which communicates with the bore of the boxing. In order to accommodate the enlargement 26, the rear of the boxing is cut away, the said cut-away portion having its walls inclined to accommodate the inclined part of the enlargement 26, as well as the substantially dove-tailed body of the said enlargement.

Having thus described my invention what I claim is:—

1. In a device for the purpose set forth, a hub provided with spokes, a boxing within the hub, said boxing having a port communicating with the bore of the boxing, a lubricant receptacle arranged between two of the spokes, said receptacle comprising an upper and a lower member, a support for the receptacle said support comprising a base having up-struck portions forming straps, each of said straps being secured to the opposite pair of spokes, each of said spokes being provided with a curved resilient plate which is adapted to frictionally contact with the opposite sides of the receptacle, a flattened spring member engaging with the top of the receptacle, and a pipe communicating between the receptacle and the port of the boxing.

2. The combination with a vehicle hub and spokes therefor, of a lubricant receptacle between two of said spokes, said receptacle comprising a pair of removable sections, the lower section being formed with oppositely arranged depressions, the upper section being provided with an angular head, a support for the receptacle, said support comprising a base having off-set ends comprising straps, said straps adapted to be connected with the spokes, each of the said straps being provided with a curved resilient plate, each of said plates contacting the opposite sides of the receptacle, the said plates being further provided with studs adapted to engage within the depressions of the receptacle a hinged flattened spring between the spokes and adapted to normally contact with the top of the receptacle, a locking element for the spring and a helical spring surrounding the receptacle and exerting pressure between the flattened spring and the straps of the support.

In testimony whereof I affix my signature in presence of two witnesses.

EDWARD A. KRIDER.

Witnesses:
B. C. ENYART,
C. G. NORSEEN.

Copies of this patent may be obtained for five cents each, by addressing the "Commissioner of Patents, Washington, D. C."